(12) United States Patent
Guo et al.

(10) Patent No.: US 12,116,511 B2
(45) Date of Patent: Oct. 15, 2024

(54) PROCESS FOR PREPARING A SOLVENTLESS POLYORGANOSILOXANE PELLET AND A WATERBORNE DISPERSION OF A SILICONE PRESSURE SENSITIVE ADHESIVE BASE

(71) Applicants: Dow Silicones Corporation, Midland, MI (US); Dow Global Technologies LLC, Midland, MI (US)

(72) Inventors: Yunlong Guo, Shanghai (CN); Hongyu Chen, Shanghai (CN); David L. Malotky, Midland, MI (US); Bin Chen, Shanghai (CN); Zhihua Liu, Shanghai (CN); Xiucuo Li, Shanghai (CN); Yan Zhou, Shanghai (CN); Wenjie Chen, Shanghai (CN); Li Ding, Shanghai (CN); Qiangqiang Yan, Zhejiang (CN)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 0 days.

(21) Appl. No.: 18/261,336

(22) PCT Filed: Apr. 9, 2021

(86) PCT No.: PCT/CN2021/086234
§ 371 (c)(1),
(2) Date: Jul. 13, 2023

(87) PCT Pub. No.: WO2022/213377
PCT Pub. Date: Oct. 13, 2022

(65) Prior Publication Data
US 2024/0301250 A1    Sep. 12, 2024

(51) Int. Cl.
*C09J 7/38* (2018.01)
*B29B 9/06* (2006.01)
(Continued)

(52) U.S. Cl.
CPC .............. *C09J 7/38* (2018.01); *B29B 9/065* (2013.01); *B29C 48/001* (2019.02);
(Continued)

(58) Field of Classification Search
CPC ..... C09J 7/38; C09J 2301/302; C09J 2483/00
See application file for complete search history.

(56) References Cited

U.S. PATENT DOCUMENTS

| 2,676,182 A | 4/1954 | Daudt et al. |
| 3,445,420 A | 5/1969 | Kookootsedes et al. |

(Continued)

FOREIGN PATENT DOCUMENTS

| CN | 101177596 | 5/2008 |
| EP | 0556023 | 8/1993 |

(Continued)

OTHER PUBLICATIONS

Lin, Shaaw B., et al., "New silicone pressure-sensitive adhesive technology". International Journal of Adhesion and Adhesives, vol. 14, Issue 3, Jul. 1994, pp. 185-191. Abstract Only.*

(Continued)

*Primary Examiner* — Bret P Chen
(74) *Attorney, Agent, or Firm* — Catherine U. Brown

(57) ABSTRACT

A process for preparing a waterborne dispersion of a silicone pressure sensitive adhesive base includes the use of a solventless polyorganosiloxane pellet containing a polyorganosilicate resin and a polyorganosiloxane gum. The waterborne dispersion of the silicone pressure sensitive adhesive base can be combined with a free radical initiator, and dried and cured to form a silicone pressure sensitive adhesive.

16 Claims, 4 Drawing Sheets

(51) Int. Cl.
*B29C 48/00* (2019.01)
*B29C 48/05* (2019.01)
*B29C 48/285* (2019.01)
*B29C 48/88* (2019.01)
*B29C 48/40* (2019.01)
*B29K 83/00* (2006.01)
*B29K 105/00* (2006.01)
*B29K 105/16* (2006.01)

(52) U.S. Cl.
CPC ........ *B29C 48/0022* (2019.02); *B29C 48/022* (2019.02); *B29C 48/05* (2019.02); *B29C 48/288* (2019.02); *B29C 48/297* (2019.02); *B29C 48/911* (2019.02); *B29C 48/40* (2019.02); *B29K 2083/00* (2013.01); *B29K 2105/16* (2013.01); *B29K 2105/251* (2013.01); *C09J 2301/302* (2020.08); *C09J 2483/00* (2013.01)

(56) References Cited

U.S. PATENT DOCUMENTS

| | | | |
|---|---|---|---|
| 3,989,667 | A | 11/1976 | Lee et al. |
| 4,584,355 | A | 4/1986 | Blizzard et al. |
| 4,585,836 | A | 4/1986 | Homan et al. |
| 4,591,622 | A | 5/1986 | Blizzard et al. |
| 4,611,042 | A | 9/1986 | Rivers-Farrell et al. |
| 4,774,310 | A | 9/1988 | Butler |
| 5,292,586 | A | 3/1994 | Lin et al. |
| 5,708,098 | A | 1/1998 | Cook et al. |
| 5,806,975 | A | 9/1998 | Hosokawa et al. |
| 5,844,031 | A | 12/1998 | Chen et al. |
| 5,861,450 | A | 1/1999 | Chen et al. |
| 6,387,487 | B1 | 5/2002 | Greenberg et al. |
| 6,545,086 | B1 | 4/2003 | Kosal |
| 6,806,339 | B2 | 10/2004 | Cray et al. |
| 7,728,080 | B2 | 6/2010 | Aoki et al. |
| 8,017,712 | B2 | 9/2011 | Berry et al. |
| 9,562,149 | B2 | 2/2017 | Cray et al. |
| 9,593,209 | B2 | 3/2017 | Dent et al. |
| 10,077,387 | B2 | 9/2018 | Ding et al. |
| 2003/0065086 | A1* | 4/2003 | Kosal .................. C08J 3/03 524/588 |
| 2003/0088042 | A1 | 5/2003 | Griswold et al. |
| 2004/0254274 | A1 | 12/2004 | Griswold |
| 2005/0038188 | A1 | 2/2005 | Ahn et al. |
| 2007/0099007 | A1 | 5/2007 | Benayoun et al. |
| 2007/0289495 | A1 | 12/2007 | Cray et al. |
| 2011/0020640 | A1* | 1/2011 | Sherman .................. C09J 7/403 428/343 |
| 2012/0095159 | A1* | 4/2012 | Liu .................. C09J 133/00 524/588 |
| 2012/0328863 | A1 | 12/2012 | Kuo |
| 2013/0040073 | A1* | 2/2013 | Pett .................. C09D 183/04 427/596 |
| 2013/0123678 | A1* | 5/2013 | Carty .................. A61F 13/0253 602/54 |
| 2014/0287642 | A1* | 9/2014 | Kumar .................. B32B 5/024 526/279 |
| 2014/0357773 | A1 | 12/2014 | Liles et al. |
| 2015/0196515 | A1* | 7/2015 | Aliyar .................. A61P 31/10 156/60 |
| 2016/0053148 | A1 | 2/2016 | Tsuchida |
| 2017/0204266 | A1* | 7/2017 | Kennedy .................. C08L 83/12 |
| 2017/0218239 | A1* | 8/2017 | Rhodes .................. C09J 7/22 |
| 2017/0233612 | A1 | 8/2017 | Han et al. |
| 2017/0333410 | A1* | 11/2017 | Babul .................. A61K 47/12 |
| 2018/0037754 | A1* | 2/2018 | Liu .................. C09D 5/002 |
| 2018/0044566 | A1* | 2/2018 | Brown .................. C09J 183/08 |
| 2018/0105692 | A1 | 4/2018 | Imaizumi et al. |

FOREIGN PATENT DOCUMENTS

| | | | |
|---|---|---|---|
| EP | 1810993 | 7/2007 | |
| EP | 2164901 | 3/2010 | |
| JP | 3516410 | 4/2004 | |
| JP | 4761049 | 8/2011 | |
| WO | 9634028 | 10/1996 | |
| WO | 9634029 | 10/1996 | |
| WO | 2009/002668 | 12/2008 | |
| WO | 2009/002681 | 12/2008 | |
| WO | 2012/094885 | 7/2012 | |
| WO | WO 2016/106022 A1 * | 6/2016 | ............... C09D 1/00 |
| WO | 2019043491 | 3/2019 | |
| WO | 2020/000389 | 1/2020 | |

OTHER PUBLICATIONS

Antosik, Adrian Krzysztof, et al., "Silicone pressure sensitive adhesives with increased thermal resistance". Journal of Thermal Analysis and Calorimetry (2022) 147:7719-7727.*

Dow Silicones Fact sheet. p. 1, No date or citation information available.*

Zhou, Yu, et al., "UV-curable silicone pressure-sensitive adhesive based on thiol-ene reaction". Progress in Organic Coatings, 186 (2024) 107954, pp. 1-11.*

Dowsil™ Q2-7406 Safety Data Sheet.

Dowsil™ Q2-7406 Technical Data Sheet.

* cited by examiner

Figure 2
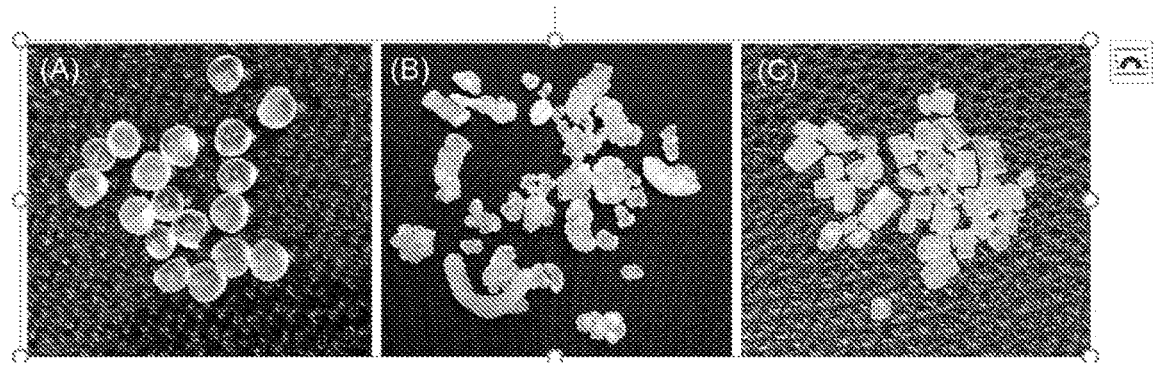
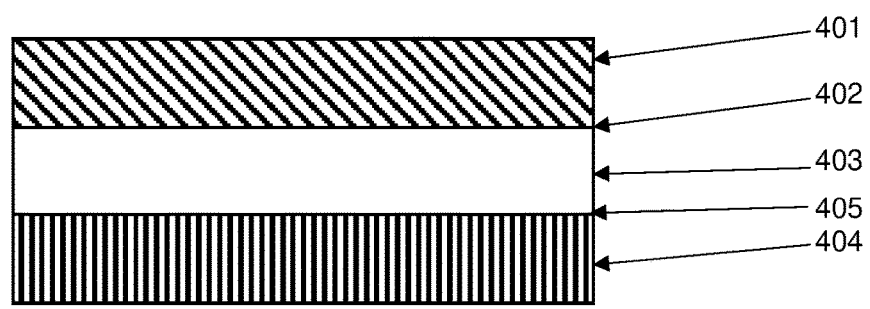
Figure 3

PROCESS FOR PREPARING A SOLVENTLESS POLYORGANOSILOXANE PELLET AND A WATERBORNE DISPERSION OF A SILICONE PRESSURE SENSITIVE ADHESIVE BASE

CROSS REFERENCE TO RELATED APPLICATIONS

This application is a U.S. national stage filing under 35 U.S.C. § 371 of PCT Application No. PCT/CN2021/086234 filed on 9 Apr. 2021, currently pending. PCT Application No. PCT/CN2021/086234 are hereby incorporated by reference.

TECHNICAL FIELD

This invention relates to a process for preparing a waterborne dispersion of a silicone pressure sensitive adhesive base. More particularly, this invention relates to a process for preparing a waterborne dispersion of a silicone pressure sensitive adhesive base that can be combined with a free radical initiator, and dried and cured to form a silicone pressure sensitive adhesive. The process for preparing the waterborne dispersion includes the use of a solventless polyorganosiloxane pellet comprised of a polyorganosilicate resin and a polyorganosiloxane gum.

INTRODUCTION

Silicone pressure sensitive adhesives (PSAs) have a myriad of end use applications such as mica tapes and/or masking tapes with excellent heat resistance, stable adhesion, and wetting properties. However, most silicone PSA products in the market are utilized in BTX (benzene, toluene, and xylene) solvents. There is an industry need for PSA products that can have low or no organic solvents, such as BTX. Silicone compositions that cure to form silicone PSAs typically contain a polyorganosiloxane gum and a polyorganosilicate resin.

Polyorganosilicate resin is typically produced in an aromatic solvent because the resin is solid at room temperature (RT). Without solvent, the resin typically has a powder or flake form, which has very low bulk density and may be difficult to store and ship. Powders can be inconvenient to handle and convey in manufacturing processes for silicone compositions such as silicone curable pressure sensitive adhesive compositions. And, flake resin typically has high glass transition temperature and high melting temperature, which make it difficult to blend with other ingredients homogeneously, especially with polyorganosiloxane gums, when preparing silicone compositions.

Pellets are a widely used delivery form for starting materials in the plastics industry. A densely packed pellet can be easily stored, shipped and conveyed by general machines like belt or screw feeders. However, use of pellets has been limited in the silicones industry.

Attempts to manufacture pellets including siloxane resins and polydiorganosiloxane polymers in the past have included dissolving the resin in solvent or combining the resin and polymer in a solvent, and thereafter removing the solvent. The resulting combination inherently contains residual solvent.

Problems to be Addressed

Therefore, there is a need in the silicones industry, particularly the silicone pressure sensitive adhesives industry, for a pelletized form of polyorganosilicate resin, which is easy to ship and store, both for manufacturing process efficiency and for mixing efficiency when combining the polyorganosilicate resin with other starting materials for products such as silicone curable pressure sensitive adhesive compositions. A process to manufacture such a pellet and use it to form waterborne dispersion of a silicone pressure sensitive adhesive base that contains no or low amounts of organic solvent such as BTX is desired.

SUMMARY

A process for preparing solventless polyorganosiloxane pellets, and a waterborne dispersion of a silicone pressure sensitive adhesive base made with the pellets, is disclosed. The process comprises:

1) providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
2) adding i) at least a portion of a solventless polydiorganosiloxane gum into the extruder through the first feed port, and adding ii) a solventless polyorganosilicate resin into the extruder through the second feed port, wherein said gum and said resin are added in amounts such that a weight ratio of resin:gum is 2.1:1 to 5:1;
3) mixing the solventless polydiorganosiloxane gum and the solventless polyorganosilicate resin in the barrel and while heating the barrel at a temperature of 200° C. to 250° C., thereby forming a mixture;
4) conveying the mixture through the die at the outlet, thereby forming a strand;
5) cooling the strand exiting the die, and
6) comminuting the strand, thereby preparing the solventless polyorganosiloxane pellets;
7) feeding into a dispersing apparatus, starting materials comprising the pellets prepared in step 6), a surfactant, water, and optionally additional polydiorganosiloxane gum in an amount sufficient to adjust the resin:gum ratio to 0.4:1 to 3:1; and
8) mixing and heating the starting materials from step 7) in the dispersing apparatus; thereby producing the waterborne dispersion of the silicone pressure sensitive adhesive base.

A process for preparing a waterborne dispersion of a silicone pressure sensitive adhesive composition comprises: practicing the process for preparing the waterborne dispersion of the silicone pressure sensitive adhesive base, and combining the waterborne dispersion of the silicone pressure sensitive adhesive base with an additional starting material comprising an initiator. The waterborne dispersion of the silicone pressure sensitive adhesive composition can be used in a process comprising coating the waterborne dispersion of the silicone pressure sensitive adhesive composition on a surface substrate, and curing to form an adhesive article.

BRIEF DESCRIPTION OF THE

DRAWINGS

Figure 1A:
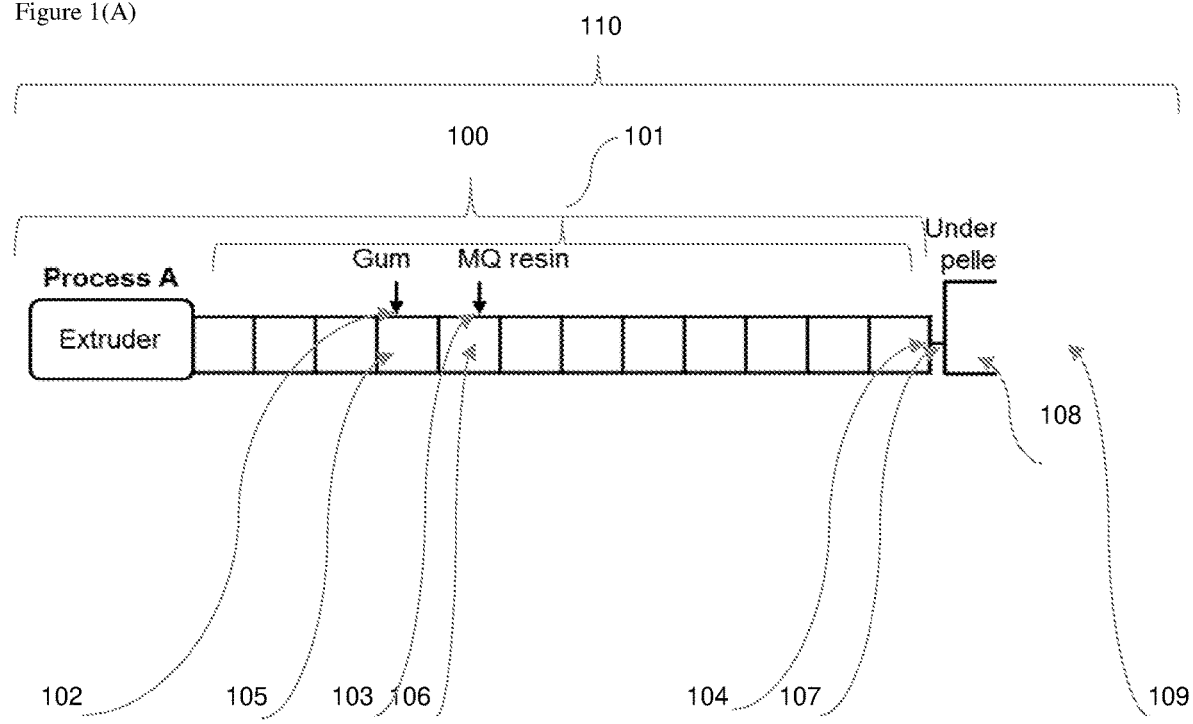
FIG. 1(A) shows a schematic diagram of an apparatus suitable for preparing pellets suitable for use in this invention.
Figure 1B:
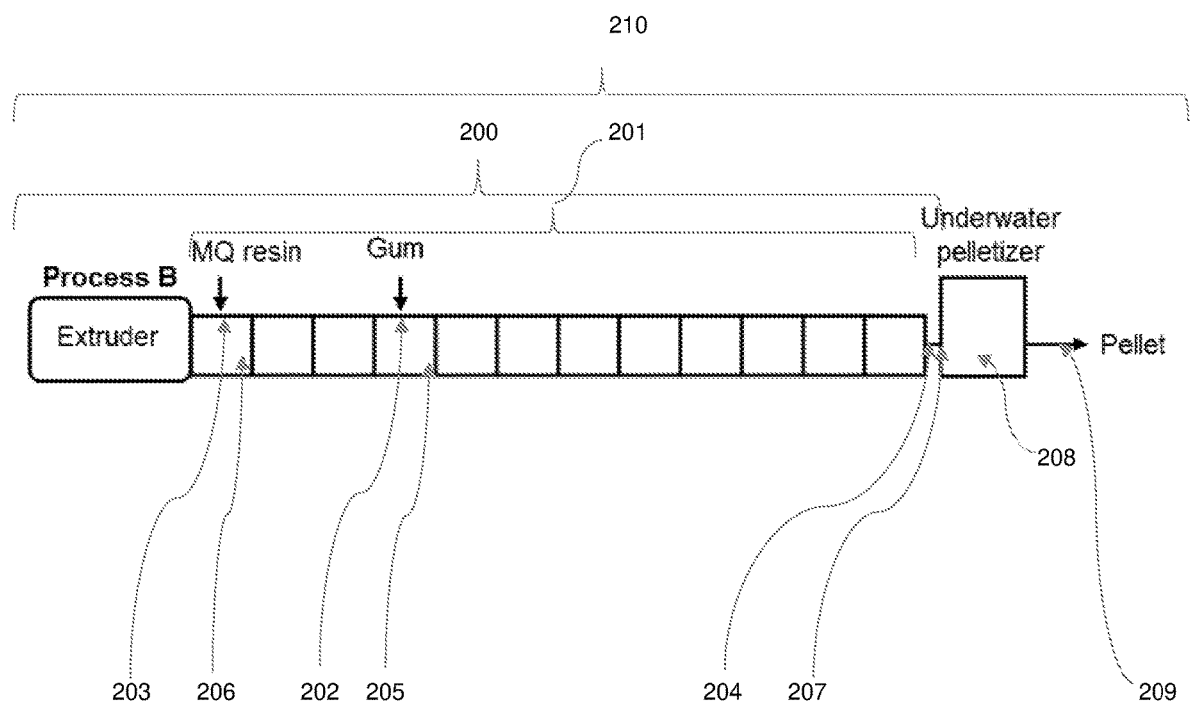
FIG. 1(B) shows a schematic diagram of an apparatus used for preparing pellets according to Comparative Example 2, below.
Figure 1C:
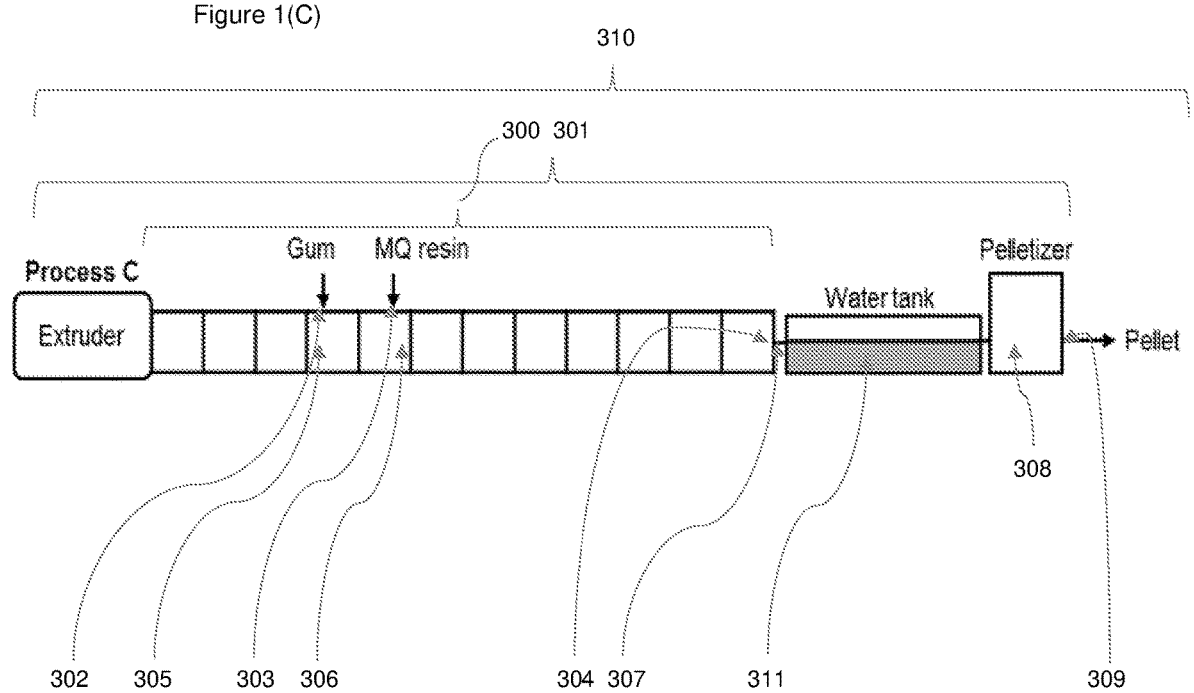

FIG. 1(C) shows a schematic diagram of an alternative apparatus suitable for preparing pellets suitable for use in this invention, FIG. 2 shows pellets made according to the Examples section herein. FIG. 2(A) shows pellets made according to Example 1, below. FIG. 2(B) shows pellets made according to Comparative Example 2, below. FIG. 2(C) shows pellets made according to Example 3, below.

FIG. 3 shows a partial cross section of an adhesive article 400. The adhesive article comprises a pressure sensitive adhesive 401 prepared by curing a pressure sensitive adhesive composition described herein on a first surface 402 of a film substrate 103. The article 400 further includes a second substrate 404 mounted to an opposing surface 405 of the film substrate 403.

DETAILED DESCRIPTION

The solventless polyorganosiloxane pellet (Pellet) prepared in the process described above comprises a polydiorganosiloxane gum (Gum) and a polyorganosilicate resin (Resin). Alternatively, the Pellet may consist essentially of Gum and Resin. Alternatively, the Pellet may consist of Gum and Resin. The amounts Gum and Resin in the Pellet are sufficient to provide a weight ratio of Resin:Gum (R:G ratio) of 2.1:1 to 5:1. Alternatively, the R:G ratio may be 2.1:1 to 4.5:1, alternatively 2.4:1 to 4.0:1, alternatively 3.0:1 to 4.0:1, alternatively 2.1:1 to 3.5:1, alternatively 2.4:1 to 3.0:1, alternatively 2.4:1 to 2.9:1, alternatively 2.7:1 to 2.9:1, and alternatively 2.4:1 to 2.5:1.

Gum

The Gum in the Pellet may be a polydiorganosiloxane gum terminated with an aliphatically unsaturated group or a hydroxyl group. The Gum has number average molecular weight (Mn)≥150,000 g/mol, alternatively 200,000 g/mol to 1,000,000 g/mol, alternatively 300,000 g/mol to 800,000 g/mol, and alternatively 500,000 g/mol to 1,000,000 g/mol, as measured by GPC according to the test method in Reference Example 1 of U.S. Pat. No. 9,593,209 beginning at col. 31.

The Gum may have unit formula (G-1): $(R^3R^2_2SiO_{1/2})_a$ $(R^2_2SiO_{2/2})_b(R^2SiO_{3/2})_c$, where each $R^2$ is independently selected from the group consisting of an alkyl group of 1 to 18 carbon atoms and an aryl group of 6 to 18 carbon atoms, and each $R^3$ is an independently selected curable group, subscript a≥2, subscript b>1500, and subscript c≥0, with the proviso that a quantity (a+b+c) is sufficient to give the Gum the Mn described above. Alternatively, subscript a may be 2. Alternatively, subscript b may be 2500 to 8000; alternatively 4000 to 6000; alternatively 5300 to 6000; and alternatively 5400 to 5900. Alternatively, subscript e may be 0.

In unit formula (G-1), $R^2$ may be an alkyl group of 1 to 18 carbon atoms. Alternatively, each $R^2$ may have 1 to 12 carbon atoms, and alternatively 1 to 6 carbon atoms. "Alkyl" means a cyclic, branched, or unbranched, saturated monovalent hydrocarbon group. Alkyl is exemplified by, but not limited to, methyl, ethyl, propyl (e.g., iso-propyl and/or n-propyl), butyl (e.g., isobutyl, n-butyl, tert-butyl, and/or sec-butyl), pentyl (e.g., isopentyl, neopentyl, and/or tert-pentyl), hexyl, heptyl, octyl, nonyl, and decyl, and branched alkyl groups of 6 to 18 carbon atoms; and cyclic alkyl groups such as cyclopentyl and cyclohexyl. Alternatively, one or more instances of $R^2$ may be an aryl group. "Aryl" means a cyclic, fully unsaturated, hydrocarbon group. Aryl is exemplified by, but not limited to, cyclopentadienyl phenyl, anthracenyl, and naphthyl. Monocyclic aryl groups may have 5 to 9 carbon atoms, alternatively 6 to 7 carbon atoms, and alternatively 5 to 6 carbon atoms. Polycyclic aryl groups may have 10 to 17 carbon atoms, alternatively 10 to 14 carbon atoms, and alternatively 12 to 14 carbon atoms. Alternatively, each $R^2$ may be independently selected from methyl and phenyl. Alternatively, each $R^2$ may be alkyl. Alternatively, each $R^2$ may be methyl.

In unit formula (G-1), each $R^3$ is a curable group. Each $R^3$ may be independently selected from the group consisting of OH and a monovalent aliphatically unsaturated hydrocarbon group of 2 to 18 carbon atoms. Alternatively, the aliphatically unsaturated hydrocarbon group for $R^3$ may have 2 to 12 carbon atoms, and alternatively 2 to 6 carbon atoms. Suitable monovalent aliphatically unsaturated hydrocarbon groups include alkenyl groups and alkynyl groups. "Alkenyl" means a monovalent hydrocarbon group having one or more carbon-carbon double bonds. Alkenyl groups may be linear, branched or cyclic. Suitable alkenyl groups are exemplified by vinyl; allyl; propenyl (e.g., isopropenyl, and/or n-propenyl); and butenyl, pentenyl, hexenyl, and heptenyl, (also including branched isomers of 4 to 7 carbon atoms); and cyclohexenyl. "Alkynyl" means a monovalent hydrocarbon group having one or more carbon-carbon triple bonds. Alkynyl groups may be branched, unbranched, or cyclic. Suitable alkynyl groups are exemplified by ethynyl, propynyl, and butynyl (also including branched isomers of 2 to 4 carbon atoms). Alternatively, aliphatically unsaturated group for $R^3$ may be alkenyl, such as vinyl, allyl, or hexenyl.

Alternatively, each $R^2$ may be an alkyl group, each $R^3$ may be independently selected from the group consisting of OH and an alkenyl group of 2 to 18 carbon atoms, subscript a may be 2, subscript c may be 0, and subscript b may be 5300 to 6000. Alternatively, each $R^2$ may be methyl; each $R^3$ may be independently selected from the group consisting of OH, vinyl, allyl, and hexenyl; subscript a may be 2; subscript c may be 0; and subscript b may be is 5400 to 5900.

Alternatively, the Gum may be a bis-hydroxyl-terminated polydiorganosiloxane. The hydroxyl-functional polydiorganosiloxane may have unit formula (G-2): $[R^2_2(HO) SiO_{1/2}]_2(R^2_2SiO_{2/2})_d$, where each $R^2$ is as described above; subscript d≥0, with the proviso that subscript d has a value sufficient to give the Gam the Mn described, above. Alternatively, the Gun may be a bis-alkenyl-terminated polydiorganosiloxane. The bis-alkenyl-terminated polydiorganosiloxane may have unit formula (G-3): $(R^2_2R^{3'}SiO_{1/2})_2$ $(R^2_2SiO_{2/2})_d$, where each $R^2$ is as described above; $R^{3'}$ is an alkenyl group as described above, and subscript d≥0, with the proviso that subscript d has a value sufficient to give the Gum the Mn described above. Alternatively, the Gum may be a combination of a bis-hydroxyl-terminated polydiorganosiloxane and a bis-alkenyl-terminated polydiorganosiloxane.

Gums are known in the art and may be prepared by methods such as hydrolysis and condensation of the corresponding organohalosilanes or equilibration of cyclic polydiorganosiloxanes. Gums are commercially available, for example, SILASTIC™ SGM-36 is commercially available from Dow Silicones Corporation of Midland, Michigan, USA. Examples of suitable Gums for use herein are exemplified by: i) dimethylvinylsiloxy-terminated polydimethylsiloxane, ii) dimethylvinylsiloxy-terminated poly(dimethylsiloxane/methylphenyl)siloxane, iii) dimethylvinylsiloxy-terminated poly(dimethylsiloxane/diphenyl)siloxane, iv)

phenyl,methyl,vinyl-siloxy-terminated polydimethylsiloxane, v) dimethylhexenylsiloxy-terminated polydimethylsiloxane, vi) dimethylhexanal-siloxy terminated poly(dimethylsiloxane/methylphenyl)siloxane, vii) dimethylhexenylsiloxy-terminated poly(dimethylsiloxane/diphenyl)siloxane, viii) hydroxyl-terminated polydimethylsiloxane, ix) hydroxyl-terminated poly(dimethylsiloxane/methylphenyl)siloxane, x) hydroxyl-terminated poly(dimethylsiloxane/diphenyl)siloxane, xi) a combination of two or more of i) to x). Alternatively, the Gum may be selected from the group consisting of i) dimethylvinylsiloxy-terminated polydimethylsiloxane, v) dimethylhexenylsiloxy-terminated polydimethylsiloxane, and a combination i) and v). Alternatively, the gum may be selected from the group consisting of viii), ix), and x). Alternatively, the Gum may be selected from the group consisting of i) and viii).

Polyorganosilicate Resin

The polyorganosilicate resin (Resin) comprises monofunctional units of formula $R^M_3SiO_{1/2}$ and tetrafunctional units ("Q" units) of formula $SiO_{4/2}$, where each RPM is an independently selected monovalent hydrocarbon group. Suitable monovalent hydrocarbon groups for $R^M$ may have 1 to 20 carbon atoms, alternatively 1 to 12 carbon atoms, alternatively 1 to 8 carbon atoms, alternatively 1 to 4 carbon atoms, and alternatively 1 to 2 carbon atoms. Alternatively, the hydrocarbon groups for $R^M$ may be selected from the group consisting of alkyl groups, alkenyl groups, and aryl groups; alternatively alkyl and aryl; alternatively alkyl and alkenyl; and alternatively alkyl. The alkyl groups and aryl groups are as described above for $R^2$ and the alkenyl groups are as the alkenyl groups described above for $R^3$. Alternatively, in the Resin, each $R^M$ may be independently selected from the group consisting of alkyl, alkenyl, and aryl. Alternatively, each $R^M$ may be selected from methyl, vinyl and phenyl. Alternatively, at least one-third, alternatively at least two thirds of the $R^M$ groups are methyl groups. Alternatively, the monofunctional units may be exemplified by $(Me_3SiO_{1/2})$, $(Me_2PhSiO_{1/2})$, and $(Me_2ViSiO_{1/2})$. The Resin is soluble in solvents such as those described herein as starting material (H), exemplified by liquid hydrocarbons, such as benzene, toluene, xylene, and heptane, or in liquid organosilicon compounds such as low viscosity linear and cyclic polydiorganosiloxanes.

When prepared, the Resin comprises the monofunctional and tetrafunctional units described above, and the polyorganosiloxane further comprises units with silanol (silicon bonded hydroxyl) groups and may comprise neopentamer of formula $Si(OSiR^M_3)_4$, where $R^M$ is as described above. $Si^{29}$ Nuclear Magnetic Resonance (NMR) spectroscopy, as described in U.S. Pat. No. 9,593,209 at col. 32, Reference Example 2, may be used to measure molar ratio of M and Q units, where said ratio is expressed as {M(resin)+(M(neopentamer)}/{Q(resin)+Q(neopentamer)} and represents the molar ratio of the total number of triorganosiloxy groups (monofunctional units) of the resinous and neopentamer portions of the Polyorganosilicate Resin to the total number of silicate groups (Q units) in the resinous and neopentamer portions.

The Mn of the Resin depends on various factors including the types of hydrocarbyl groups represented by $R^M$ that are present. The Mn of the Resin refers to the number average molecular weight measured using GPC according to the procedure in U.S. Pat. No. 9,593,209 at col 31, Reference Example 1, when the peak representing the neopentamer is excluded from the measurement. The Mn of the Resin may be greater than 2,000 g/mol, alternatively 2,500 g/mol to 15,000 g/mol. Alternatively, Mn of the Resin may be 2,000 g/mol to 8,000 g/mol, alternatively 2,900 g/mol to 6,000 g/mol, and alternatively 2,900 to 5,000 g/mol.

The Resin can be prepared by any suitable method, such as cohydrolysis of the corresponding silanes or by silica hydrosol capping methods. The Resin may be prepared by silica hydrosol capping processes such as those disclosed in U.S. Pat. No. 2,676,182 to Daudt, et al.; U.S. Pat. No. 4,611,042 to Rivers-Farrell et al.; and U.S. Pat. No. 4,774,310 to Butler, et at. The method of Daudt, et al, described above involves reacting a silica hydrosol under acidic conditions with a hydrolyzable triorganosilane such as trimethylchlorosilane, a siloxane such as hexamethyldisiloxane, or mixtures thereof, and recovering a copolymer having monofunctional units and tetrafunctional units. The resulting copolymers generally contain from 2 to 5 percent by weight of hydroxyl groups.

The intermediates used to prepare the Resin may be triorganosilanes and silanes with four hydrolyzable substituents or alkali metal silicates. The triorganosilanes may have formula $R^M_3SiX^1$, where $R^M$ is as described above and $X^1$ represents a hydrolyzable substituent. Silanes with four hydrolyzable substituents may have formula $SiX^2_4$, where each $X^2$ is halogen, alkoxy or hydroxyl. Suitable alkali metal silicates include sodium silicate.

The Resin prepared as described above typically contains silicon bonded hydroxyl groups, e.g., of formulae, $HOSi_{3/2}$ and/or $HOR^M_2SiO_{1/2}$. The Polyorganosilicate Resin may comprise up to 5% of silicon bonded hydroxyl groups by weight, alternatively up to 2% on the same basis. The concentration of silicon bonded hydroxyl groups present in the Resin may be determined using Fourier Transform-infra Red (FTIR) spectroscopy according to ASTM Standard E-168-16. For certain applications, it may desirable for the amount of silicon bonded hydroxyl groups to be below 0.7%, alternatively below 0.3%, alternatively less than 1%, and alternatively 0.3% to 0.8%. Silicon bonded hydroxyl groups formed during preparation of the Resin can be converted to trihydrocarbyl siloxane groups or to a different hydrolyzable group by reacting the Resin with a silane, disiloxane, or disilazane containing the appropriate terminal group. Silanes containing hydrolyzable groups may be added in molar excess of the quantity required to react with the silicon bonded hydroxyl groups on the Resin.

Alternatively, the Resin may further comprises 2% or less, alternatively 0.7% or less, and alternatively 0.3% or less, and alternatively 0.3% to 0.8% of units represented by formula $XSiO_{3/2}$ and/or $XR^M_2SiO_{1/2}$ where $R^M$ is as described above, and X represents a hydrolyzable substituent, as described above for $X^1$.

Alternatively, the Resin may have terminal aliphatically unsaturated groups. The Resin having terminal aliphatically unsaturated groups may be prepared by reacting the product of Daudt, et al. with an unsaturated organic group-containing endblocking agent and an endblocking agent free of aliphatic unsaturation, in an amount sufficient to provide from 3 to 30 mole percent of unsaturated organic groups in the final product. Examples of endblocking agents include, but are not limited to, silazanes, siloxanes, and silanes. Suitable endblocking agents are known in the art and exemplified in U.S. Pat. Nos. 4,584,355; 4,591,622; and 4,585,836. A single endblocking agent or a mixture of such agents may be used to prepare such resin.

Alternatively, the Resin may comprise unit formula (R-1): $(R^1R^2_2SiO_{1/2})_w(R^2_3SiO_{1/2})_x(SiO_{4/2})_yX_z$, where $R^2$ and X are as described above, each $R^1$ is an independently selected aliphatically unsaturated group of 2 to 18 carbon atoms (such as that described above for $R^3$), and subscripts w, x, y, and z have average values such that w≥0, x≥0, y≥1, z≥0, and a quantity (w+x)>4. Alternatively, each $R^2$ in unit formula (R-1) may be alkyl, alternatively methyl. A quantity (w+x+y+z) is sufficient to give the Resin a weight average molecular weight of 2,000 g/mol to 15,000 g/mole, alternatively 8,000 to 10,000, and alternatively 9,000 to 9,500. Alternatively, each $R^1$ may be independently selected from the group consisting of vinyl, allyl, and hexenyl. Alternatively, each X may be OH. Alternatively, subscript x may be 40 to 55, alternatively 43 to 50. Alternatively, subscript y may be 45 to 65, alternatively 50 to 57. Alternatively, subscript z may be 0 to a value sufficient to provide the resin with up to 5 weight % OH groups, alternatively up to 2 weight %, and alternatively up to 0.7 weight % OH groups. Alternatively, the Resin may comprise unit formula (R-2): $(R^2_3SiO_{1/2})_v$ $(SiO_{4/2})_yX_z$, where $R^2$, X, subscript y, and subscript z are as described above and subscript v>4.

The Resin described above may be prepared in solvent but is then subsequently devolatilized. For example, the Resin may be dried by heating to a temperature up to 150° C. to remove solvent without degrading the Resin. For example, the Resin may be heated, optionally with reduced pressure to remove solvent. The solventless polyorganosilicate resin contains non-detectable or 0 to 2%, alternatively 0% to 1%, alternatively 0 ppm to 100 ppm of residual solvent, e.g., from the resin manufacturing process. In the method for preparing the Pellet, the solventless polyorganosilicate resin used may be in the form of a powder or flake.

Method of Preparing Solventless Polyorganosiloxane Pellet

The solventless polyorganosiloxane pellet (Pellet) comprises the Resin and the Gum, described above. The Pellet is solventless, and as used herein, the term 'solventless' means that solvent is not intentionally added during manufacture of the Pellet. One skilled in the art would recognize that polyorganosilicate resins may be prepared with the use of solvents, however, the solventless polyorganosilicate resin used in this method has been devolatilized as described above to remove solvent, and that solvent is not added during the method of making the Pellet. The solventless polyorganosilicate resin may be fed into the extruder as a flake or powder.

A process for preparing the Pellet described above comprises:
1) providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
2) adding i) at least a portion of a Gum as described above into the extruder through the first feed port, and adding ii) a Resin as described above into the extruder through the second feed port, wherein said Gum and said Resin are added in amounts such that a weight ratio Resin:Gum is 2.1:1 to 5:1;
3) mixing the Gum and the Resin in the barrel and while heating the barrel at a temperature of 200° C. to 250° C., thereby forming a mixture;
4) conveying the mixture through the die at the outlet, thereby forming a strand;
5) cooling the strand exiting the die, and
6) comminuting the strand, thereby preparing the Pellet.

The method described above may optionally further comprise preparing a solvent-borne polyorganosilicate resin and devolatilizing the solvent-borne polyorganosilicate resin to form the solventless polyorganosilicate resin before step 2).

In the method described above, all of the Gum may be added in the first feed port. Alternatively, up to 15% of the Gum may be added in the second feed port (e.g., in a blend with the Resin).

Steps 5) and 6) may be performed sequentially or concurrently. For example, steps 5) and 6) may be performed concurrently (i.e., in one piece of equipment) such as an underwater pelletizer. Alternatively, steps 5) and 6) may be performed sequentially using separate pieces of equipment, such as a water bath for cooling the strand in step 5) and a separate pelletizer in step 6). Commercially available equipment may be used to perform the method described above. Extruders, such as twin-screw extruders, and pelletizing equipment are known in the art and are commercially available. The resulting Pellet prepared as described above is useful for preparing a waterborne dispersion of a silicone pressure sensitive adhesive base.

Process for Making the Waterborne Dispersion of the Silicone Pressure Sensitive Adhesive Base The Pellet described above can be used in a process for making a waterborne dispersion of a silicone pressure sensitive adhesive base. This process comprises:
practicing the process comprising steps 1) to 6) described above, thereby preparing the Pellets;
7) feeding into a dispersing apparatus, starting materials comprising the Pellets prepared in step 6), additional polydiorganosiloxane gum in an amount sufficient to adjust the resin:gum ratio to 0.4:1 to 2:1, a surfactant, and water; and
8) mixing and heating the starting materials from step 7) in the dispersing apparatus; thereby producing the aqueous dispersion of the silicone pressure sensitive adhesive base. This process may further comprise collecting the waterborne dispersion of the silicone pressure sensitive adhesive base when it exits the dispersing apparatus.

Step 7) may be performed in conventional continuous process equipment for preparing a waterborne siloxane dispersion. Illustrative examples of continuous mixers/compounders include extruders, such as single-screw, twin-screw, and multi-screw extruders, and co-rotating extruders, such as those manufactured by Krupp Werner & Pfleiderer Corp (Ramsey, NJ), and Leistritz (NJ); and twin-screw counter-rotating extruders, two-stage extruders, twin-rotor continuous mixers, dynamic or static mixers, or combinations of these types of equipment. Alternatively, the dispersing apparatus used in step 7) may be an extruder; alternatively a twin-screw extruder.

When an extruder is used in step 7) of the process for making the waterborne dispersion of the silicone pressure sensitive adhesive base, the extruder may be the same as the extruder used to make the Pellet as described above. Alternatively, a different extruder may be used in step 7) of the process for making the waterborne dispersion of the silicone pressure sensitive adhesive base. The extruder used for making the waterborne dispersion of the silicone pressure sensitive adhesive base may comprises a barrel having one or more feed ports spaced along the barrel, a screw mechanism housed within the barrel, and an outlet which is optionally fitted with a back pressure regulator. The screw mechanism is capable of mixing and conveying the starting materials from the feed ports to the outlet. This extruder may further comprise heating means configured to heat the barrel.

The feed ports are configured to introduce starting materials into the extruder. The extruder may optionally further comprise a back pressure regulator at the outlet to control the pressure inside the extruder. Step 7) and/or step 8) may be performed at a temperature of 50° C. to 200° C., alternatively 70° C. to 150° C.

Additional Gum

The additional polydiorganosiloxane gum may be added in step 7) to adjust the resin:gum ratio from the Pellets to a value suitable for a silicone pressure sensitive adhesive composition. The additional polydiorganosiloxane gum is as described above, and the additional polydiorganosiloxane gum selected may be the same as or different from the polydiorganosiloxane gum used to prepare the Pellets. The amount of the additional polydiorganosiloxane gum added is sufficient to provide the waterborne dispersion of the silicone pressure sensitive adhesive base with a resin:gum ratio to 0.4:1 to 3:1, alternatively 0.4:1 to 2:1, alternatively 0.5:1 to 1.9:1, alternatively 0.7:1 to 18:1, alternatively 0.9:1 to 0.7:1, and alternatively 1:1 to 1.5:1.

Surfactant

The waterborne dispersion of the silicone pressure sensitive adhesive base comprises a surfactant. The surfactant may be a solid or liquid. Solid surfactants may be delivered as aqueous dispersions containing 25% to 75% of the solid surfactant (active). The surfactant may be fed into the dispersing apparatus with the Pellet. Alternatively, the surfactant may be fed into the dispersing apparatus with the water. Alternatively, the surfactant may be fed into the dispersing apparatus separately from the other starting materials. The surfactant is selected from the group consisting of anionic surfactants, nonionic surfactants, and combinations of both anionic and nonionic surfactants, with the proviso that the surfactant does not include sulfonic acids and their salt derivatives, long chain carboxylic acid surfactants and their salts, fatty acid amines and amides and their salts and derivatives, alkylglucosides, and linear silicone polyethers.

The anionic surfactants include alkyl sulfates having at least 6 carbon atoms in the alkyl substituent, such as sodium lauryl sulfate; and the sulfate esters of polyoxyethylene monoalkyl ethers. Some other examples of anionic surfactants are alkali metal sulfosuccinates; sulfonated glyceryl esters of fatty acids such as sulfonated monoglycerides of coconut oil acids; salts of sulfonated monovalent alcohol esters such as sodium oleyl isothionate; sulfonated products of tatty acid nitriles such as palmitonitrile sulfonate; sulfonated aromatic hydrocarbons such as sodium alpha-naphthalene monosulfonate; condensation products of naphthalene sulfonic acids with formaldehyde; sodium octahydro anthracene sulfonate; alkali metal alkyl sulfates; ether sulfates having alkyl groups of eight or more carbon atoms such as sodium lauryl ether sulfate; and alkylaryl sulfonates having one or more alkyl groups of eight or more carbon atoms.

Commercial anionic surfactants which can be used include sodium salt of alkyl alkoxylate sulfate sold under the trademark DOWFAX™ AS-801 by The Dow Chemical Company of Midland, Michigan, USA; sodium n-hexadecyl diphenyloxide disulfonate sold under the trademark DOWFAX™ 8390 by The Dow Chemical Company, Midland, Michigan; and the sodium salt of a secondary alkane sulfonate sold under the trademark HOSTAPUR™ SAS 60 by Clariant Corporation, Charlotte, North Carolina.

Some suitable nonionic surfactants which can be used include polyoxyethylene alkyl ethers, polyoxyethylene alkyl phenyl ethers, polyoxyethylene fatty acid esters, sorbitan fatty acid esters, and polyoxyethylene sorbitan fatty acid esters, Nonionic surfactants which are commercially available include compositions such as (i) 2,6,8-trimethyl-4-nonyl polyoxyethylene ether sold under the names TERGITOL™ TMN-10; (ii) the C11-15 secondary alkyl polyoxyethylene ethers sold under the names, TERGITOL™ 15-5-9, TERGITOL™ 15-S-15, TERGITOL™ 15-S-30, and TERGITOL™ 15-S-40, by the Dow Chemical Company, of Midland, Michigan, USA; octylphenyl polyoxyethylene (40) ether sold under the name TRITON™ X405 by the Dow Chemical Company; (iii) nonylphenyl polyoxyethylene (10) ether sold under the name MAKON™ 10 by the Stepan Company; (iv) ethoxylated alcohols sold under the name Trycol 5953 by Henkel Corp./Emery Group, of Cincinnati, Ohio, USA; (v) ethoxylated alcohols sold under the name BRIJ™ 123 and BRIJ™ L4 by Croda Inc. of Edison, New Jersey, USA, (vi) alkyl-oxo alcohol polyglycol ethers such as GENAPOL™ UD 050, and GENAPOL™ UDI 10, (vii) alkyl polyethylene glycol ether based on C10-Guerbet alcohol and ethylene oxide such as LUTENSOL™ XP 79.

Suitable nonionic surfactants also include poly(oxyethylene)-poly(oxypropylene)-poly(oxyethylene) tri-block copolymers. Poly(oxyethylene)-poly(oxypropylene)-poly(oxyethylene) tri-block copolymers are also commonly known as Poloxamers. They are nonionic triblock copolymers composed of a central hydrophobic chain of polyoxypropylene (poly(propylene oxide)) flanked by two hydrophilic chains of polyoxyethylene (poly(ethylene oxide)). Poly(oxyethylene)-poly(oxypropylene)-poly(oxyethylene) tri-block copolymers are commercially available from BASF of Florham Park, New Jersey, USA, and are sold under the tradename PLURONIC™, such as PLURONIC™ L61, L62, L64, L81, P84.

Other suitable nonionic surfactants include polyoxyethylene alkyl ethers, polyoxyethylene alkylphenol ethers, polyoxyethylene lauryl ethers, polyoxyethylene sorbitan monooleates, polyoxyethylene alkyl esters, polyoxyethylene sorbitan alkyl esters, polypropylene glycol, diethylene glycol, ethoxylated trimethylnonanois, and polyoxyalkylene glycol modified polysiloxane surfactants. Commercially available nonionic surfactants which can be used include compositions such as 2,6,8-trimethyl-4-nonyloxy polyethylene oxyethanols sold under the trademark TERGITOL™ TMN-10; alkyleneoxy polyethylene oxyethanol ($C_{11-15}$ secondary alcohol ethoxylates 7EO, 9EO, and 15EO) sold under the trademarks TERGITOL™ 15-S-7, TERGITOL™ 15-S-9, TERGTTOL™ 15-S-15; other $C_{11-15}$ secondary alcohol ethoxylates sold under the trademarks ECOSURP™ EH-40 and TERGITOL™ 15-5-12, 15-S-20, 15-S-30, and 15-S-40; octylphenoxy polyethoxy ethanol (40EO) sold under the trademark TRITON™ X-405; and alcohol ethoxylates with tradename ECOSURF™ EH, such as ECOSURF™ EH-40. All of these surfactants are sold by the Dow Chemical Company.

Other useful commercial nonionic surfactants are nonylphenoxy polyethoxy ethanol (10EO) sold under the trademark MAKON™ 10 by Stepan Company; polyoxyethylene 23 lauryl ether (Laureth-23) sold commercially under the trademark BRIJ™ 35L by ICI Surfactants, of Wilmington, Delaware, USA; and RENEX™ 30, a polyoxyethylene ether alcohol also sold by ICI Surfactants.

Suitable nonionic surfactants also include poly(oxyethylene)-poly(oxypropylene)-poly(oxyethylene) tri-block copolymers. Poly(oxyethylene)-poly(oxypropylene)-poly(oxyethylene) tri-block copolymers are also commonly known as Poloxamers. They are nonionic triblock copolymers composed of a central hydrophobic chain of polyoxypropylene (poly(propylene oxide)) flanked by two hydrophilic chains of polyoxyethylene (poly(ethylene oxide)). Poly(oxyethylene)-poly(oxypropylene)-poly(oxyethylene) tri-block copolymers are commercially available from BASF (Florham Park, NJ) and are sold under the tradename FLURONIC™, such as PLURONIC™ L61, L62, L64, L1, P84.

Other useful commercial nonionic surfactants are nonylphenoxy polyethoxy ethanol (10IEO) sold under the trademark MAKON™ 10 by Stepan Company, Northfield, Illinois; polyoxyethylene 23 lauryl ether (Laureth-23) sold commercially under the trademark BRIJ™ 35L by ICT Surfactants, Wilmington, Delaware; and RENEX™ 30, a polyoxyethylene ether alcohol sold by ICI Surfactants, Wilmington, Delaware.

The nonionic surfactant may also be a resinous silicone polyether (SPE). The SPE may be a polyorganosilicate resin having polyether groups bonded to silicon atoms therein. Suitable SPE's include DOWSIL™ 2-3216 INT from Dow Silicones Corporation from Dow Silicones Corporation of Midland, Michigan, USA.

Alternatively, the nonionic surfactant may comprise a polyvinyl alcohol compound. Polyvinyl alcohol compounds are known in the art and are disclosed, for example in U.S. Patent Application Publication 20007/0099007 at paragraphs [0172] and [0173]. Polyvinyl alcohol compounds may be made by saponification of polyvinylacetate, so up to 15% of polyvinylacetate may remain in the polyvinyl alcohol compound used herein. Alternatively, the polyvinyl alcohol compound may be 88% to 92% polyvinyl alcohol (with the balance being 12% to 8% polyvinylacetate). The polyvinyl alcohol compound may have a minimum viscosity of 5 cP at 4% aqueous solution at 20° C.

The surfactant used in the process described herein may be one surfactant or a combination of two or more surfactants. The amount of surfactant depends on various factors including the type and amount of surfactant selected, however, the amount of surfactant may be sufficient to provide 0.1% to 20%, alternatively 0.5% to 10%, based on combined weights of Resin and Gum.

Water

The water is not generally limited, and may be utilized neat (i.e., absent any carrier vehicles/solvents), and/or pure (i.e., free from or substantially free from minerals and/or other impurities). For example, the water may be processed or unprocessed before use in the process described above. Examples of processes that may be used for purifying the water include distilling, filtering, deionizing, and combinations of two or more thereof, such that the water may be deionized, distilled, and/or filtered. Alternatively, the water may be unprocessed (e.g. may be tap water provided by a municipal water system or well water, used without further purification). Alternatively, the water may be purified before use in the process.

The water may be utilized in any amount, which will be selected by one of skill in the art, depending on various factors, e.g., the desired dilution of the silicone pressure sensitive adhesive composition to be prepared. Alternatively, the amount of water in the waterborne dispersion of the silicone pressure sensitive adhesive base may be 10% to 95%, alternatively 30% to 70%, based on combined weights of all starting materials in the waterborne dispersion of the silicone pressure sensitive adhesive base.

Process for Making a Waterborne Dispersion of a Silicone Pressure Sensitive Adhesive Composition The waterborne dispersion of the silicone pressure sensitive adhesive base may be used in a process to make a waterborne dispersion of a silicone pressure sensitive adhesive composition. This process comprises: practicing the process comprising steps 1) to 8) described above to form the waterborne dispersion of the silicone pressure sensitive adhesive base, and 9) mixing the waterborne dispersion of the silicone pressure sensitive adhesive base and an additional starting material selected from the group consisting of a free radical initiator, a solvent, a coating additive, and a combination thereof; thereby forming the waterborne dispersion of the silicone pressure sensitive adhesive composition. Step 9) may be performed by any convenient means, using batch, semi-continuous, or continuous processing. The continuous process equipment discussed above fore step 7) may be used. Alternatively, mixing in step 9) may be performed in a batch, semi-continuous, or continuous mode. Batch equipment with high-shear, and high-speed dispersers, may be used and are commercially available, such as those made by Charles Ross & Sons (NY), Hockmeyer Equipment Corp. (NJ); batch mixing equipment such as those sold under the tradename Speedmixer™; and batch equipment with high shear actions, e.g., Banbury-type (CW Brabender Instruments Inc., NJ) and Henschel type (Henschel mixers America, TX). Alternatively, mixing in step 9) may be performed, for example using batch mixing equipment with medium/low shear including change-can mixers, double-planetary mixers, conical-screw mixers, ribbon blenders, double-arm or sigma-blade mixers. The coating additive is exemplified by a defoamer, a wetting agent, a pH adjusting additive, and a combination of two or more thereof.

Free Radical Initiator

The free radical initiator may comprise an organic peroxide compound, such as an alkyl peroxide, a diacyl peroxide, a peroxide ester, and/or a peroxide carbonate. Suitable organic peroxide compounds include benzoyl peroxide; 4-monochlorobenzoyl peroxide; dicumyl peroxide; tert-butylperoxybenzoate; tert-butyl cumyl peroxide; tert-butyloxide 2,5-dimethyl-2,5-di-tert-butylperoxyhexane; 2,4-dichlorobenzoyl peroxide; di-tertbutylperoxy-diisopropyl benzene; 1,1-bis(tert-butylperoxy)-3,3,5-trimethylcyclohexane; 2,5-di-tert-butylperoxyhexane-3,2,5-dimethyl-2,5-bis(tert-butylperoxy) hexane, or cumyl-tert-butyl peroxide. Suitable peroxide compounds are known in the art and are disclosed, for example, in U.S. Patent Application Publication 2018/0105692 at paragraph [0093].

The amount of free radical initiator added in step 9) depends on various factors including the type and amount of initiator selected and the selection of other starting materials, however, the initiator may be added in an amount 1% to 10%, alternatively 2% to 6%, and alternatively 2% to 5% based on combined weights Resin and Gum.

Solvent

A solvent may optionally be added to the waterborne dispersion of the silicone pressure sensitive adhesive composition in step 7) and/or step 9), described below. Without wishing to be bound by theory, it is thought that the solvent may aid mixing and/or delivery of one or more of the starting materials. For example, the initiator may be dissolved or dispersed in a solvent to facilitate nixing. Suitable solvents include, polyalkylsiloxanes and/or organic solvents such as alcohols, ketones, aromatic hydrocarbons, aliphatic hydrocarbons, glycol ethers, tetrahydrofuran, mineral spirits, naphtha, tetrahydrofuran, mineral spirits, naphtha, or a combination thereof. Polyalkylsiloxanes with suitable vapor pressures may be used as the solvent, and these include hexamethyldisiloxane, octamethyltrisiloxane, hexamethylcyclotrisiloxane and other low molecular weight polyalkylsiloxanes, such as 0.5 to 1.5 cSt DOWSIL™ 200 Fluids and DOWSIL™ OS FLUIDS, which are commercially available from Dow Silicones Corporation of Midland, Michigan, U.S.A.

Alternatively, an organic solvent may be used. The organic solvent can be an alcohol such as methanol, ethanol, isopropanol, butanol, or n-propanol; a ketone such as acetone, methylethyl ketone, or methyl isobutyl ketone; an aromatic hydrocarbon such as benzene, toluene, or xylene; an aliphatic hydrocarbon such as heptane, hexane, or octane; a glycol ether such as propylene glycol methyl ether, dipropylene glycol methyl ether, propylene glycol n-butyl ether, propylene glycol n-propyl ether, or ethylene glycol n-butyl ether, tetrahydrofuran; mineral spirits; naphtha; or a combination thereof.

The amount of solvent will depend on various factors including the type of solvent selected and the amount and type of other starting materials selected for the waterborne dispersion of the silicone pressure sensitive adhesive composition. However, the amount of solvent may be 0% to <1.0%, alternatively 0% to <2%, alternatively 0% to <1%, and alternatively 0% to 0.5%, based on combined weights of all starting materials in the waterborne dispersion of the silicone pressure sensitive adhesive composition. Alternatively, the solvent may be omitted.

An optional starting material may also be added to the waterborne dispersion of the silicone pressure sensitive adhesive composition prepared by the process described above. Such optional starting materials include, for example, a defoamer, a wetting agent, a pH adjusting additive, and a combination of two or more thereof. Other optional starting materials include, for example, a reactive diluent, a fragrance, a preservative, a filler such as, silica, quartz or chalk; and a combination of two or more thereof.

Alternatively, the curable silicone pressure sensitive adhesive compositions may be free of filler or contain only a limited amount of filler, such as 0 to 30% by weight of the curable silicone pressure sensitive adhesive composition. Fillers can agglomerate or otherwise stick to the coater equipment used to apply the curable silicone pressure sensitive adhesive compositions to substrates. Fillers can also hinder optical properties, for example transparency, of the silicone pressure sensitive adhesive and/or any tape formed therewith.

Methods of Use

The waterborne dispersion of the silicone pressure sensitive adhesive composition prepared as described above, may be used to form an adhesive article, e.g., a silicone pressure sensitive adhesive (prepared by curing the curable silicone pressure sensitive adhesive composition described above) on a substrate. The adhesive article may be prepared by a process comprising: preparing the waterborne dispersion of the silicone pressure sensitive adhesive composition by practicing the process described above, coating the waterborne dispersion of the silicone pressure sensitive adhesive composition on a surface of a substrate, and curing the silicone pressure sensitive adhesive composition to form the silicone pressure sensitive adhesive. Before (and optionally during) curing, the substrate may be dried to remove all or a portion of the water from the waterborne dispersion of the silicone pressure sensitive adhesive composition, thereby leaving the silicone pressure sensitive adhesive composition on the substrate.

To improve bonding of the silicone pressure sensitive adhesive to the substrate, this process may optionally further comprise treating the surface of the substrate before coating the waterborne dispersion of the silicone pressure sensitive adhesive composition thereon. Treating the surface of the substrate may be performed by any convenient means, such as applying a primer, or subjecting the substrate to corona-discharge treatment, etching, or plasma treatment before coating the waterborne dispersion of the silicone pressure sensitive adhesive composition on the substrate.

Coating the silicone pressure sensitive adhesive composition on the surface of the substrate can be performed by any convenient means. For example, the curable silicone pressure sensitive adhesive composition may be coated onto the surface of the substrate by gravure coater, offset coater, offset-gravure coater, roller coater, reverse-roller coater, air-knife coater, or curtain coater.

The substrate can be any material that can withstand the curing conditions (described herein) used to cure the silicone pressure sensitive adhesive composition to form the silicone pressure sensitive adhesive on the substrate. For example, any substrate that can withstand heat treatment at a temperature equal to or greater than 150° C., alternatively 50° C. to 120° C. is suitable. Examples of materials suitable for such substrates including plastic films such as polyimide (PI), polyetheretherketone (PEEK), polyethylene naphthalate (PEN), liquid-crystal polyarylate, polyamideimide (PAI), polyether sulfide (PES), or polyethylene terephthalate (PET), or polyethylene (PE), or polypropylene (PP), Alternatively, the substrate may be a metal foil such as aluminum foil or copper foil. Alternatively, the substrate may be a paper, such as Kraft paper, as well. The thickness of the substrate is not critical, however, the thickness may range from 5 micrometers to 300 micrometers.

Drying may be performed before and/or during curing. Drying may be performed by heating at a temperature sufficient to evaporate the water (and when present the solvent), such as 50° C. to 120° C. to remove water and cure. Alternatively, drying may be performed by heating at a temperature of 50° C. to 120° C., alternatively 50° C. to 100° C., and alternatively 70° C. to 80° C. for a time sufficient to remove all or a portion of the water (e.g., 30 seconds to 1 hour, alternatively 1 minute to 5 minutes). The method, further comprises curing the silicone pressure sensitive adhesive composition at RT or with heating at a temperature of 80° C. to 220° C., alternatively 140° C. to 220° C., alternatively 150'C to 220° C., alternatively 160° C. to 200° C., and alternatively 165° C. to 180° C. for a time sufficient to cure the silicone pressure sensitive adhesive composition (e.g., for 30 seconds to an hour, alternatively 1 minute to 5 minutes). If cure speed needs to be increased or the process curing temperatures lowered, the initiator level can be increased. This forms a silicone pressure sensitive adhesive on the substrate. Drying and/or curing may be performed by placing the substrate in an oven. The amount of the silicone pressure sensitive adhesive composition to be applied to the substrate depends on the specific application, however, the amount may be sufficient such that after curing thickness of the silicone pressure sensitive adhesive may be 5 micrometers to 200 micrometers.

The method described herein may optionally further comprise applying a removable release liner to the silicone pressure sensitive adhesive opposite the substrate, e.g., to protect the silicone pressure sensitive adhesive before use of the adhesive article. The release liner may be applied before, during or after curing the curable silicone pressure sensitive adhesive composition; alternatively after curing.

EXAMPLES

These examples are intended to illustrate the invention to one skilled in the art and are not to be interpreted as limiting the scope of the invention set forth in the claims. The materials in Table 1 were used in these examples.

TABLE 1

Starting Materials

| Starting Material | Description | Commercial Name or Source |
|---|---|---|
| Polyorganosilicate Resin R1 | trimethylsiloxysilicate of unit formula $((CH_3)_3SiO_{1/2})_{43}(SiO_{4/2})_{57}$ with silanol content of 2.8% and Mn of 4,255 g/mol | Dow Silicones Corporation |
| Polyorganosilicate Resin R2 | trimethylsiloxysilicate of unit formula $((CH_3)_3SiO_{1/2})_{48}(SiO_{4/2})_{52}$ with Mw = 20,518 Da, Mn = 4,913 g/mol, and hydroxyl content = 0.25 weight % based on weight of the resin | Dow Silicones Corporation |
| Polyorganosilicate Resin R3 | trimethylsiloxysilicate of unit formula $((CH_3)_3SiO_{1/2})_{50}(SiO_{4/2})50$ methyl-capped with silanol content = 0.05 weight % and Mn = 2,900 g/mol | Dow Silicones Corporation |
| Polyorganosilicate Resin R4 | Trimethylsiloxysilicate of unit formula $((CH_3)_3SiO_{1/2})_{50}(SiO_{4/2})_{51}$ methyl-capped withsilanol content = 0.08 weight % and Mn = 4100 g/mol | Dow Silicones Corporation |
| Polyorganosilicate Resin R5 | trimethylsiloxysilicate of unit formula $((CH_3)_3SiO_{1/2})_{47}(SiO_{4/2})_{53}$ OH ended with silanol content = 2.8 weight % and Mn = 3800 g/mol | Dow Silicones Corporation |
| Gum G1 | dimethylvinylsiloxy-terminated poly(dimethyl/methylvinyl) siloxane of unit formula $M^{Vi}_2D_{5462}D^{Vi}_{7.5}$ | Dow Silicones Corporation 4-7062 |
| Gum G2 | dimethylvinylsiloxy-terminated polydimethylsiloxane of unit formula $M^{Vi}_2D_{5471}$ | Dow Silicones Corporation 4-7033 |
| Gum G3 | bis-dimethylvinylsiloxy-terminated polydimethylsiloxane having number average molecular weight of 702,000 g/mol measured by GPC and vinyl content of 0.01% | Dow Silicones Corporation SGM-26 |
| Gum G4 | bis-hydroxyl-terminated polydimethylsiloxane gum with unit formula $M^{OH}_2D_{5836}$ | SILASTIC ™ SGM-36 from Dow Silicones Corporation |
| Surfactant 1 | Alcohol ethoxylate, 75% solid water solution | ECOSURF ™ EH-40 from TDCC |
| Surfactant 2 | Sodium salt of alkyl alkoxylate sulfate, 50% water solution | DOWFAX ™ AS-801 from TDCC |
| Surfactant 3 | a commercially available polyether modified MQ resin in a polyether carrier, which has been diluted to a concentration of 50% in water to form a solution | 2-3216 INT from Dow Silicones Corporation |
| Surfactant 4 | Polyvinyl Alcohol, 10% water solution | GH-17S from Nippon Synthetic Chemical Industry Co., Ltd. |
| Water | deionized water | |
| Peroxide 1 (Initiator) | 40% benzoyl peroxide in 60% organic solvent | PERKADOX ™ L-40 RPS from Nouryon |
| pH Adjusting Agent | potassium hydroxide | SCRC |
| Defoamer | Commercial defoamer | XIAMETER ™ AFE-3168 Antifoam Emulsion from Dow Silicones Corporation |

Example 1—Apparatus and Procedure for Preparing Pellets

FIG. 1(A) shows an apparatus 110 for preparing pellets (Process A). The apparatus 110 comprised a twin-screws extruder (Leistritz; ZSE27 MAXX with L/D=48 and 12 stages) 100 upstream of an underwater pelletizer 108. The twin screw extruder 100 had a barrel 101 with a first feed port 102, a second feed port 103, and an outlet 104 with a die (not shown); heating means (not shown) configured to heat the barrel 101; and a screw mechanism (not shown) housed within the barrel 101. The first feed port 102 was configured to introduce gum into the extruder at the fourth stage 105. The second feed port 103 was configured to introduce polyorganosilicate resin into the fifth stage 106. The screw mechanism was configured to mix and convey the gum and resin from the first feed port 102 and the second feed port 103 to the outlet 104 through the die to form a strand 107, which entered the underwater pelletizer 108. The underwater pelletizer was configured to cool and comminute the strand 107 to form pellets which exited the extruder at exit port 109.

All or a portion of the gum was fed into the extruder 100 through the first feed port 102. All of the resin was fed into the extruder 100 through the second feed port 103. For some samples, where a portion of the gum was added via the first feed port 102, the balance of the gum was added via the second feed port 103 with the resin. The barrel was heated at 200° C. to 250° C. The gum added in the first feed port 102 was fed at 2.5 kg/hr and the resin (optionally including a portion of the gum) added in the second feed port 103 was fed at 7.5 kg/hr. The gum and resin were mixed and conveyed to the outlet 104 through the die (not shown) thereby forming the strand 107. The strand entered the underwater pelletizer 108 and was comminuted into pellets exiting the apparatus 110 at exit port 109. Table 2, below, shows the formulations of gum and resin that formed pellets using this general procedure.

Table 2, below, shows compositions of pellets prepared using the procedure of Reference Example 1. The type of Resin and Gum are as defined in Table 1. Amounts of Resin and Gum are in weight parts.

TABLE 2

Compositions of Pellets

| Composition No. | Type of Resin fed in first feed port | Amount of Resin in first feed port | Type of Gum fed in first feed port | Amount of Gum fed in first feed port | Type of Gum fed in second feed port | Amount of Gum in second feed port |
|---|---|---|---|---|---|---|
| 1 | R1 | 75 | NONE | 0 | G3 | 12.5 |
|   |    |    |      |   | G4 | 12.5 |
| 2 | R2 | 71.25 | G1 | 3.75 | G3 | 12.5 |
|   |    |       |    |      | G4 | 12.5 |
| 3 | RS | 49.875 | G4 | 3.75 | G3 | 12.5 |
|   | R4 | 21.375 |    |      | G4 | 12.5 |
| 4 | R3 | 16.7325 | G2 | 3.765 | G3 | 12.5 |
|   | R4 | 54.5025 |    |       | G4 | 12.5 |
| 5 | R1 | 35 | G1 | 2 | G4 | 25 |
|   | R2 | 38 |    |   |    |    |
| 6 | R1 | 49 | G1 | 1.3 | G4 | 25 |
|   | R2 | 24.7 |  |     |    |    |
| 7 | R1 | 56 | G1 | 0.95 | G4 | 25 |
|   | R2 | 18.05 | |      |    |    |
| 8 | RI | 64 | G1 | 0.55 | G4 | 25 |
|   | R2 | 10.45 | |      |    |    |

Comparative Example 2

FIG. 1(B) shows an apparatus 210 for preparing pellets (Process B). The apparatus 210 comprised a twin-screw extruder (Leistritz ZSE27 MAXX with L/D 48 and 12 stages) 200 upstream of an underwater pelletizer 208. The twin screw extruder 200 had a barrel 201 with a first feed port 203, a second feed port 202, and an outlet 204 with a die (not shown); heating means (not shown) configured to heat the barrel 201; and a screw mechanism (not shown) housed within the barrel 201. The first feed port 203 was configured to introduce resin into the extruder at the first stage 206. The second feed port 202 was configured to introduce gum into the fourth stage 205. The screw mechanism was configured to mix and convey the resin and gum from the first feed port 203 and the second feed port 202 to the outlet 204 through the die to form a strand 207, which entered the underwater pelletizer 208. The underwater pelletizer was configured to cool and comminute the strand 207 to form pellets which exited the extruder at exit port 209.

All of the resin was fed into the extruder 200 through the first feed port 203. All of or a portion of the gum was fed into the extruder 200 through the second feed port 202. For some samples, where a portion of the gum was added via the first feed port 203 with the resin, the balance of the gum was added via the second feed port 202. The barrel was heated at 200° C. to 250° C. The gum added in the second feed port 202 was fed at 2.5 kg/hr and the resin (optionally including a portion of the gum) added in the first feed port 203 was fed at 7.5 kg/hr. The gum and resin were mixed and conveyed to the outlet 204 through the die (not shown) thereby forming the strand 207. The strand entered the underwater pelletizer 208 and was comminuted into pellets exiting the apparatus 210 at exit port 209. Composition 1 in Table 2, above was used.

FIG. 2 (A) shows pellets made by the method of Example 1 using Composition No. 1 in Table 2. FIG. 2(B) shows pellets made by the method of Comparative Example 2 using Composition No. 1 in Table 2. Pellets made by the method of Comparative Example 2 were nonuniform in size, shape, and appearance. Without wishing to be bound by theory, it is thought that Example 1 and Comparative Example 2 show that the order of addition (i.e., adding at least 85% of the Gum before adding the Resin) provides a benefit in the method for making pellets herein, i.e., pellets have more uniform size and shape and improved appearance using the claimed method.

Example 3

FIG. 1(C) shows an apparatus 310 for preparing pellets (Process C). The apparatus 310 comprised a twin-screw extruder (Leistritz ZSE-27 MAXX with L/D=48 and 12 stages) 300 upstream of a water tank 311, which was upstream of a pelletizer 308. The twin screw extruder 300 had a barrel 301 with a first feed port 302, a second feed port 303, and an outlet 304 with a die (not shown); heating means (not shown) configured to heat the barrel 301; and a screw mechanism (not shown) housed within the barrel 301. The first feed port 302 was configured to introduce gum into the extruder at the fourth stage 305. The second feed port 303 was configured to introduce polyorganosilicate resin into the fifth stage 306. The screw mechanism was configured to mix and convey the gum and resin from the first feed port 302 and the second feed port 303 to the outlet 304 through the die to form a strand 307, which entered the water tank 311 and thereafter the underwater pelletizer 308. The underwater pelletizer 308 was configured to cool and comminute the strand 307 to form pellets which exited the extruder at exit port 309.

All or a portion of the gum was fed into the extruder 300 through the first feed port 302. All of the resin was fed into the extruder 300 through the second feed port 303. For some samples, where a portion of the gum was added via the first feed port 302, the balance of the gum was added via the second feed port 303 with the resin. The barrel was heated at 200° C. to 250° C. The gum added in the first feed port 302 was fed at 2.5 kg/hr and the resin (optionally including a portion of the gum) added in the second feed port 303 was fed at 7.5 kg/hr. The gum and resin were mixed and conveyed to the outlet 304 through the die (not shown) thereby forming the strand 307. The strand entered the underwater pelletizer 308 and was comminuted into pellets exiting the apparatus 310 at exit port 309. As in Example 1 and Comparative Example 2, Composition 1 from Table 2, above, was used to prepare pellets. Pellets are shown below in FIG. 2(C). Example 3 showed that pellets of acceptable quality can be prepared using the method described herein with different pelletizing equipment provided, that the order of addition for Gum and Resin is used.

Pellets prepared according to the method of Example 1 using Composition No. 4 and Composition No. 3 in Table 2 above, were used to make silicone pressure sensitive adhesives.

Example 4

Additional pellets were prepared using the procedure of Example 1, with the starting materials shown Table 3. Gum 4 was fed into the first port of the extruder, and either a Resin, or a blend of a Resin and a Gum was fed in the second port.

TABLE 3

Composition of Pellets

| Starting Material | Description | Units | For1 | For2 | For3 | For4 | For5 | For6 |
|---|---|---|---|---|---|---|---|---|
| Gum G4 | Gum G4 in Table 1 | Kg/hr | 2.68 | 2.68 | 2.68 | 2.68 | 2.68 | 2.68 |
| Resin R1 | Resin R1 in Table 1 | Kg/hr | 10.00 | 1.50 | 2.50 | 3.50 | 0 | 0 |
| Blend 1 | 95% Resin R2 and 5% Gum G1 as described in Table 1 | Kg/hr | 0 | 8.50 | 7.50 | 6.50 | 0 | 0 |
| Blend 2 | 22.31% Resin R3, 72.67% Resin R4, 5.02% Gum G2 | Kg/hr | 0 | 0 | 0 | 0 | 10.00 | 0 |
| Blend 3 | 66.5% Resin R5 28.51% Resin R4, 5% Gum G4 | Kg/hr | 0 | 0 | 0 | 0 | 0 | 10.00 |
| | Resin:Gum Ratio | | 3.7:1 | 3.1:1 | 3.2:1 | 3.2:1 | 3.0:1 | 3.0:1 |
| | Total | Kg/hr | 12.68 | 12.68 | 12.68 | 12.68 | 12.68 | 12.68 |

Example 5

Waterborne dispersions of silicone pressure sensitive, adhesive bases were prepared as follows.

The pellets prepared as described in Example 4 were fed by a loss-in-weight screw feeder into the first barrel of a 25 mm twin screw extruder (Coperion ZSK26 with L/D=48 and 12 stages), followed by the Gum fed by a gear pump at the second or third barrel. Surfactant was injected at die. $4^{th}$ (or $5^{th}$, or $6^{th}$) barrel by a piston pump (ISCO 1000D) together with 5-2-5% (weight ratio to silicone solid, i.e., combination of Resin and Gum) water. The remaining water was injected at the farther downstream barrels (e.g. $8^{th}$ to $12^{th}$). All the barrels were set at 80-120° C., and extruder was operated at 300-900 RPM. The waterborne dispersions of silicone pressure sensitive adhesive bases were collected at the outlet of the extruder.

The amounts of each starting material are shown below in Table 4.

TABLE 4

Composition of Waterborne Dispersions of Silicone Pressure Sensitive Adhesive Bases

| Starting Material | Units | Dis1 | Dis2 | Dis3 | Dis4 | Dis5 | Dis6 |
|---|---|---|---|---|---|---|---|
| Gum G4 from Table 1 | g/min | 23.4 | 19.5 | 19.5 | 15.6 | 23.4 | 15.6 |
| For1 from Table 4 | g/min | 46.8 | 0 | 0 | 0 | 0 | 0 |
| For2 from Table 4 | g/min | 0 | 52.0 | 0 | 0 | 0 | 0 |
| For3 from Table 4 | g/min | 0 | 0 | 52.0 | 0 | 0 | 0 |
| For4 from Table 4 | g/min | 0 | 0 | 0 | 54.7 | 0 | 0 |
| For5 from Table 4 | g/min | 0 | 0 | 0 | 0 | 46.8 | 0 |
| For6 from Table 4 | g/min | 0 | 0 | 0 | 0 | 0 | 46.8 |
| Surfactant 1 from Table 1 | g/min | 7.0 | 7.0 | 0 | 0 | 0 | 0 |
| Surfactant 2 from Table 1 | g/min | 0 | 0 | 8.4 | 8.4 | 0 | 0 |
| Surfactant 3 from Table 1 | g/min | 0 | 0 | 0 | 0 | 12.0 | 0 |
| Surfactant 4 from Table 1 | g/min | 0 | 0 | 0 | 0 | 0 | 14.0 |
| Water | g/min | 40 | 50 | 20 | 70 | 30 | 60 |
| Calculated | % solids | 60% | 55% | 71% | 47% | 63% | 49% |
| Calculated | R:G ratio | 1.0:1 | 1.2:1 | 1.2:1 | 1.4:1 | 1.0:1 | 1.5:1 |
| Measured Mean particle size | μm | 0.93 | 0.54 | 0.33 | 0.30 | 1.38 | 4.60 |
| Total | g/min | 117.2 | 128.5 | 99.9 | 148.7 | 112.2 | 141.5 |

Example 6

Waterborne dispersions of silicone pressure sensitive adhesive compositions were prepared as follows: 10 grams of prepared dispersion, certain weight of initiator (PERKADOX™ L-40 RPS, Nouryon) and optionally some additives were directly added together and mixed by a SpeedMixer™ for 1 min at 2000 RPM.

The amounts of each starting material are shown below in Table 5.

TABLE 5

Composition of Waterborne Dispersions of Silicone Pressure Sensitive Adhesive Compositions

| Starting Material/Description | Units | Inv1 | Inv2 | Inv3 | Inv4 | Inv5 | Inv6 | Inv7 | Inv8* |
|---|---|---|---|---|---|---|---|---|---|
| Dis1/See Table 5 | g | 10 | 0 | 0 | 0 | 0 | 0 | 0 | 0 |
| Dis2/See Table 5 | g | 0 | 10 | 0 | 0 | 0 | 0 | 10 | 0 |
| Dis3/See Table 5 | g | 0 | 0 | 10 | 0 | 0 | 0 | 0 | 10 |
| Dis4/See Table 5 | g | 0 | 0 | 0 | 10 | 0 | 0 | 0 | 0 |
| Dis5/See Table 5 | g | 0 | 0 | 0 | 0 | 10 | 0 | 0 | 0 |
| Dis6/See Table 5 | g | 0 | 0 | 0 | 0 | 0 | 10 | 0 | 0 |
| Initiator/See Table 1 | g | 0.75 | 0.41 | 0.53 | 0.35 | 0.47 | 0.38 | 0.41 | 0.53 |
| Calculated value BPO/siloxane solid | % | 5% | 3% | 3% | 3% | 3% | 3% | 3% | 3% |
| Defoamer/See Table 1 | ppm | 0 | 0 | 0 | 0 | 0 | 0 | 100 | 0 |
| pH Adjusting Agent/See Table 1 | g | 0 | 10 | 0 | 0 | 0 | 0 | 0 | 0.02 |

*In Inv8, pH was adjusted from 7.6 to 11.2 by using KOH.

Example 7

The samples prepared in Example 6 were tested for adhesion to SUS according to the test method below. Results are in Table 6.

TABLE 6

PSA Performance on PET Film

| Measurements | Inv1 | Inv2 | Inv3 | Inv4 | Inv5 | Inv6 | Inv7 | Inv8 |
|---|---|---|---|---|---|---|---|---|
| Thickness | 30-35 μm | 30-35 μm | 30-35 μm | 30-35 μm | 30-35 μm | 30-35 μm | 30-35 μm | 30-35 μm |
| Adhesion to SUS | 535 g/in | 797 g/in | 750 g/in | 1031 g/in | 240 g/in | 50 g/in | 820 g/in | 1085 g/in |

Test Methods used herein included the following:

Particle size was measured by Beckman Coulter LS230 Laser Diffraction Particle Size Analyzer.

Adhesion to Stainless Steel (SUS) was tested according to following procedure. A four bird bard was used to draw the waterborne dispersion of the silicone pressure sensitive adhesive composition down on two PET substrates. The coated substrates were heated for 2 minutes at 80° C. and 3 minutes at 180° C. The coated substrates were then cooled and cut into 1 inch wide strips. A one inch strip was applied to a clean stainless steel panel/glass. Samples were tested the following day by pulling at 180° and 12 inches per minute on the TMI Release and Adhesion Tester. Units were grams per inch.

Weight average molecular weight and number average molecular weight of starting materials including the Gum and the Resin described above may be measured by gel permeation chromatography (GPC) according to the test method in Reference Example 1 of U.S. Pat. No. 9,593,209 beginning at col. 31.

INDUSTRIAL APPLICABILITY

The examples above show that silicone pressure sensitive adhesives with good adhesion to stainless steel can be prepared by the process described herein. Inv 7 and Inv 8 show that additives can be included in the samples (comparable to Inv 2 and Inv3, respectively), and these may improve adhesion.

Definitions and Usage of Terms

Unless otherwise indicated by the context of the specification; all amounts, ratios, and percentages herein are by weight; the articles 'a', 'an', and 'the' each refer to one or more; and the singular includes the plural. The SUMMARY and ABSTRACT are hereby incorporated by reference. The transitional phrases "comprising", "consisting essentially of", and "consisting of" are used as described in the Manual of Patent Examining Procedure Ninth Edition, Revision 08.2017, Last Revised January 2018 at section § 2111.03 I., II., and III. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. DOWSIL™, SILASTIC™ and SYL-OFF™ branded materials are commercially available from Dow Silicones Corporation of Midland, Michigan, USA. The abbreviations used herein have the definitions in Table 8.

TABLE 8

Abbreviations

| Abbreviation | Definition |
|---|---|
| ° C. | degrees Celsius |
| CT | coat thickness |

TABLE 8-continued

Abbreviations

| Abbreviation | Definition |
|---|---|
| D unit | a dimethylvinylsiloxy unit of formula $(CH_3)_2SiO_{2/2}$ |
| $D^{Vi}$ unit | a methylvinylsiloxy unit of formula $(CH_3)(CH_2\!\!=\!\!CH)SiO_{2/2}$ |
| GPC | gel permeation chromatography |
| Mn | number average molecular weight measured by GPC |
| M unit | a trimethylsiloxy unit of formula $(CH_3)_3SiO_{1/2}$ |
| $M^{OH}$ unit | a siloxy unit of formula $(CH_3)_2(HO)SiO_{1/2}$ |
| $M^{Vi}$ unit | a dimethylvinyl siloxy unit of formula $(CH_3)_2(CH_2\!\!=\!\!CH)SiO_{1/2}$ |
| mPa · s | milli-Pascal seconds |
| NMR | nuclear magnetic resonance |
| Q unit | a unit of formula $SiO_{4/2}$ |
| RPM | revolutions per minute |
| RT | Room temperature of 20° C. to 25° C. |
| um | Micrometers |

EMBODIMENTS OF THE INVENTION

In a first embodiment, a process for preparing a water-borne dispersion of a silicone pressure sensitive adhesive base from solventless polyorganosiloxane pellets comprises:
1) providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
2) adding i) at least a portion of a solventless polydiorganosiloxane gum into the extruder through the first feed port, and adding ii) a solventless polyorganosilicate resin into the extruder through the second feed port, wherein said gum and said resin are added in amounts such that a weight ratio resin:gum is 2.1:1 to 5:1;
3) mixing the solventless polydiorganosiloxane gum and the solventless polyorganosilicate resin in the barrel and while heating the barrel at a temperature of 200° C. to 250° C., thereby forming a mixture;
4) conveying the mixture through the die at the outlet, thereby forming a strand;
5) cooling the strand exiting the die, and
6) comminuting the strand, thereby preparing the solventless polyorganosiloxane pellets;
7) feeding into a dispersing apparatus, starting materials comprising the pellets prepared in step 6); a surfactant selected from the group consisting of an anionic surfactant, a nonionic surfactant, and a combination of both; and water; and optionally additional polydiorganosiloxane gum in an amount sufficient to adjust the resin:gum ratio to 0.4:1 to 3:1; with the proviso that the surfactant does not include sulfonic acids and their salt derivatives, long chain carboxylic acid surfactants and their salts, fatty acid amines and amides and their salts and derivatives, alkylglucosides, and linear silicone polyethers; and
8) mixing and heating the starting materials from step 7) in the dispersing apparatus; thereby producing the aqueous dispersion of the silicone pressure sensitive adhesive base.

In a second embodiment, the process of the first embodiment further comprises: preparing a solvent-borne polyorganosilicate resin and devolatilizing the solvent-borne polyorganosilicate resin to form the solventless polyorganosilicate resin before step 2).

In a third embodiment, the in the process of the first embodiment or the second embodiment, the solventless polyorganosilicate resin comprises unit formula $(R^1R^2{}_2SiO_{1/2})_w(R^2{}_3Si_{1/2})_x(SiO_{4/2})_yX_z$, where each $R^2$ is independently selected from the group consisting of an alkyl group of 1 to 18 carbon atoms and an aryl group of 6 to 18 carbon atoms; each $R^2$ is an independently selected alkenyl group of 2 to 18 carbon atoms; X represents a hydrolyzable substituent; subscript w≥0, subscript x>4, subscript y>1, subscript z≥0 with the proviso that a quantity (w+x+y+z) is sufficient to give the resin a number average molecular weight of 2,000 g/mol to 15,000 g/mole.

In a fourth embodiment, in the process of any one of the first to third embodiments, the solventless polydiorganosiloxane gum comprises unit formula $(R^3R^2{}_2SiO_{1/2})_a(R^2{}_2SiO_{2/2})_b(R^2SiO_{3/2})_c$, where each $R^2$ is independently selected from the group consisting of an alkyl group of 1 to 18 carbon atoms and an aryl group of 6 to 18 carbon atoms, and each $R^3$ is a curable group, subscript a≥2, subscript b>5000, and subscript c≥0, with the proviso that a quantity (a+b+c) is sufficient to provide said gum with a number average molecular weight of 150,000 g/mol to 1,000,000 g/mol.

In a fifth embodiment, in the process of any one of the first to fourth embodiments, all of the gum is added in the first feed port.

In a sixth embodiment, in the process of any one of the first to fifth embodiments, 0 to 15% of the gum is added in the second feed port.

In a seventh embodiment, in the process of any one of the first to sixth embodiments, steps 5) and 6) are performed using an underwater pelletizer.

In an eighth embodiment, in the process of any one of the first to seventh embodiments, the dispersing apparatus in step 7) is an additional extruder.

In a ninth embodiment, a process for preparing a waterborne dispersion of a silicone pressure sensitive adhesive composition comprises:
1) providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
2) adding i) at least a portion of a solventless polydiorganosiloxane gum into the extruder through the first feed port, and adding ii) a solventless polyorganosilicate resin into the extruder through the second feed port, wherein said gum and said resin are added in amounts such that a weight ratio resin:gum is 2.1:1 to 5:1;
3) mixing the solventless polydiorganosiloxane gum and the solventless polyorganosilicate resin in the barrel and while heating the barrel at a temperature of 200° C. to 250° C., thereby forming a mixture;
4) conveying the mixture through the die at the outlet, thereby forming a strand;
5) cooling the strand exiting the die;
6) comminuting the strand, thereby preparing the solventless polyorganosiloxane pellets;
7) feeding into a dispersing apparatus, starting materials comprising the pellets prepared in step 6); a surfactant selected from the group consisting of an anionic surfactant, a nonionic surfactant, and a combination thereof; and water; and optionally additional polydiorganosiloxane gum in an amount sufficient to adjust the resin:gum ratio to 0.4:1 to 2:1, with the proviso that the surfactant does not include sulfonic acids and their salt derivatives, long chain carboxylic acid surfactants and their salts, fatty acid amines and amides and their salts and derivatives, alkylglucosides, and linear silicone polyethers; and
8) mixing and heating the starting materials from step 7) in the dispersing apparatus; thereby producing the aqueous dispersion of the silicone pressure sensitive adhesive base; and
9) adding an additional starting material to the waterborne dispersion of the silicone pressure sensitive adhesive base, wherein the additional starting material is selected from the group consisting of a free radical initiator, a solvent, a coating additive, and a combination thereof; thereby forming the waterborne dispersion of the silicone pressure sensitive adhesive composition.

In a tenth embodiment, in the process of the ninth embodiment, the coating additive is present, and the coating additive is selected from the group consisting of a defoamer, a wetting agent, and a pH adjusting additive.

In an eleventh embodiment, a process for preparing an adhesive article comprises:

11. A method for preparing an adhesive article comprising:
1) providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
2) adding i) at least a portion of a solventless polydiorganosiloxane gum into the extruder through the first feed port, and adding ii) a solventless polyorganosilicate resin into the extruder through the second feed port, wherein said gum and said resin are added in amounts such that a weight ratio resin:gum is 2.1:1 to 5:1;
3) mixing the solventless polydiorganosiloxane gum and the solventless polyorganosilicate resin in the barrel and while heating the barrel at a temperature of 200° C. to 250° C., thereby forming a mixture;
4) conveying the mixture through the die at the outlet, thereby forming a strand;
5) cooling the strand exiting the die;
6) comminuting the strand, thereby preparing the solventless polyorganosiloxane pellets;
7) feeding into a dispersing apparatus, starting materials comprising the pellets prepared in step 6); a surfactant that does not include sulfonic acids and their salt derivatives, long chain carboxylic acid surfactants and their salts, quaternary ammonium salts, fatty acid amines and amides and their salts and derivatives, betaines, alkylglucosides, and linear silicone polyethers; and water; and optionally additional polydiorganosiloxane gum in an amount sufficient to adjust the resin:gum ratio to 0.4:1 to 2:1; and
8) mixing and heating the starting materials from step 7) in the dispersing apparatus; thereby producing the aqueous dispersion of the silicone pressure sensitive adhesive base; and
9) adding an additional starting material to the waterborne dispersion of the silicone pressure sensitive adhesive base, wherein the additional starting material is selected from the group consisting of a free radical initiator, a solvent, a coating additive, and a combination thereof; thereby forming the waterborne dispersion of the silicone pressure sensitive adhesive composition
optionally 10) treating a surface of a substrate,
11) coating the waterborne dispersion of the silicone pressure sensitive adhesive composition on the surface of the substrate,
optionally 12) removing all or a portion of the water and, if present, the solvent, to form a layer of the pressure sensitive adhesive composition on the surface of the substrate, and
13) curing the silicone pressure sensitive adhesive composition to form a silicone pressure sensitive adhesive.

What is claimed is:

1. A process for preparing a waterborne dispersion of a silicone pressure sensitive adhesive base from solventless polyorganosiloxane pellets, said process comprising:
1) Providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
2) Adding i) at least a portion of a solventless polydiorganosiloxane gum into the extruder through the first feed port, and adding ii) a solventless polyorganosilicate resin into the extruder through the second feed port, wherein said gum and said resin are added in amounts such that a weight ratio resin:gum is 2.1:1 to 5:1;
3) Mixing the solventless polydiorganosiloxane gum and the solventless polyorganosilicate resin in the barrel and while heating the barrel at a temperature of 200° C. to 250° C., thereby forming a mixture;
4) Conveying the mixture through the die at the outlet, thereby forming a strand;
5) Cooling the strand exiting the die, and
6) comminuting the strand, thereby preparing the solventless polyorganosiloxane pellets;
7) Feeding into a dispersing apparatus, starting materials comprising the pellets prepared in step 6); optionally additional polydiorganosiloxane gum in an amount sufficient to adjust the resin:gum ratio to 0.4:1 to 3:1; a surfactant selected from the group consisting of an anionic surfactant, a nonionic surfactant, and a combination thereof; and water; with the proviso that the surfactant does not include sulfonic acids and their salt derivatives, long chain carboxylic acid surfactants and their salts, fatty acid amines and amides and their salts and derivatives, alkylglucosides, and linear silicone polyethers; and 8) Mixing and heating the starting materials from step 7) in the dispersing apparatus; thereby producing the aqueous dispersion of the silicone pressure sensitive adhesive base.

2. The process of claim 1, further comprising: preparing a solvent-borne polyorganosilicate resin and devolatilizing the solvent-borne polyorganosilicate resin to form the solventless polyorganosilicate resin before step 2).

3. The process of claim 1, where the solventless polyorganosilicate resin comprises unit formula $(R^1R^2{}_2SiO_{1/2})_w(R^2{}_3SiO_{1/2})_x(SiO_{4/2})_yX_z$, where each $R^2$ is independently selected from the group consisting of an alkyl group of 1 to 18 carbon atoms and an aryl group of 6 to 18 carbon atoms; each $R^1$ is an independently selected alkenyl group of 2 to 18 carbon atoms; X represents a hydrolyzable substituent; subscript w≥0, subscript x>4, subscript y>1, subscript z≥0 with the proviso that a quantity (w+x+y+z) is sufficient to give the resin a number average molecular weight of 2,000 g/mol to 15,000 g/mole.

4. The process of claim 1, where the solventless polydiorganosiloxane gum comprises unit formula $(R^3R^2{}_2SiO_{1/2})_a(R^2{}_2SiO_{2/2})_b(R^2SiO_{3/2})_c$, where each $R^2$ is independently selected from the group consisting of an alkyl group of 1 to 18 carbon atoms and an aryl group of 6 to 18 carbon atoms, and each $R^3$ is a curable group, subscript a≥2, subscript b>5000, and subscript c≥0, with the proviso that a quantity (a+b+c) is sufficient to provide said gum with a number average molecular weight of 150,000 g/mol to 1,000,000 g/mol.

5. The process of claim 1, where all of the gum is added in the first feed port.

6. The process of claim 1, where 0 to 15% of the gum is added in the second feed port.

7. The process of claim 1, where steps 5) and 6) are performed using an underwater pelletizer.

8. The process of claim 1, where the dispersing apparatus in step 7) is an additional extruder.

9. A process for preparing a waterborne dispersion of a silicone pressure sensitive adhesive composition, where the process comprises:
   I) practicing the process of claim 1 to form the waterborne dispersion of the silicone pressure sensitive adhesive base, and
   II) adding an additional starting material to the waterborne dispersion of the silicone pressure sensitive adhesive base, wherein the additional starting material is selected from the group consisting of a free radical initiator, a solvent, a coating additive, and a combination thereof;
   thereby forming the waterborne dispersion of the silicone pressure sensitive adhesive composition.

10. The process of claim 9, where the coating additive is present, and the coating additive is selected from the group consisting of a defoamer, a wetting agent, and a pH adjusting additive.

11. A method for preparing an adhesive article comprising:
   optionally 1) treating a surface of a substrate,
   2) practicing the process of claim 9 to form the waterborne dispersion of the silicone pressure sensitive adhesive composition, and coating the waterborne dispersion of the silicone pressure sensitive adhesive composition on the surface of the substrate,
   optionally 3) removing all or a portion of the water and, if present, the solvent, to form a layer of the pressure sensitive adhesive composition on the surface of the substrate, and
   4) curing the silicone pressure sensitive adhesive composition to form a silicone pressure sensitive adhesive.

12. A process for preparing solventless polyorganosiloxane pellets comprising:
   1) Providing an extruder comprising a barrel having a first feed port, a second feed port, and an outlet with a die; heating means configured to heat the barrel; and a screw mechanism housed within the barrel, where the first feed port and the second feed port are configured to introduce starting materials into the extruder, the screw mechanism is capable of mixing and conveying the starting materials from the first feed port and the second feed port to the outlet, the first feed port is upstream of the second feed port, and the second feed port is upstream of the outlet;
   2) Adding i) at least a portion of a solventless polydiorganosiloxane gum into the extruder through the first feed port, and adding ii) a solventless polyorganosilicate resin into the extruder through the second feed port, wherein said gum and said resin are added in amounts such that a weight ratio resin:gum is 2.1:1 to 5:1;
   3) Mixing the solventless polydiorganosiloxane gum and the solventless polyorganosilicate resin in the barrel and while heating the barrel at a temperature of 200° C. to 250° C., thereby forming a mixture;
   4) Conveying the mixture through the die at the outlet, thereby forming a strand;
   5) Cooling the strand exiting the die, and
   6) Comminuting the strand, thereby preparing the solventless polyorganosiloxane pellets.

13. The process of claim 12, where the solventless polyorganosilicate resin comprises unit formula $(R^1R^2{}_2SiO_{1/2})_w(R^2{}_3SiO_{1/2})_x(SiO_{4/2})_yX_z$, where each $R^2$ is independently selected from the group consisting of an alkyl group of 1 to 18 carbon atoms and an aryl group of 6 to 18 carbon atoms; each $R^1$ is an independently selected alkenyl group of 2 to 18 carbon atoms; X represents a hydrolyzable substituent; subscript w≥0, subscript x>4, subscript y>1, subscript z≥0 with the proviso that a quantity (w+x+y+z) is sufficient to give the resin a number average molecular weight of 2,000 g/mol to 15,000 g/mole.

14. The process of claim 12, where the solventless polydiorganosiloxane gum comprises unit formula $(R^3R^2{}_2SiO_{1/2})_a(R^2{}_2SiO_{2/2})_b(R^2SiO_{3/2})_c$, where each $R^2$ is independently selected from the group consisting of an alkyl group of 1 to 18 carbon atoms and an aryl group of 6 to 18 carbon atoms, and each $R^3$ is a curable group, subscript a≥2, subscript b>5000, and subscript c≥0, with the proviso that a quantity (a+b+c) is sufficient to provide said gum with a number average molecular weight of 150,000 g/mole to 1,000,000 g/mole.

15. The process of claim 14, where the weight ratio resin:gum is 2.1:1 to 3.5:1.

16. A method for preparing an adhesive article comprising:
   optionally 1) treating a surface of a substrate,
   2) practicing the process of claim 10 to form the waterborne dispersion of the silicone pressure sensitive adhesive composition, and coating the waterborne dispersion of the silicone pressure sensitive adhesive composition on the surface of the substrate, optionally 3) removing all or a portion of the water and, if present, the solvent, to form a layer of the pressure sensitive adhesive composition on the surface of the substrate, and 4) curing the silicone pressure sensitive adhesive composition to form a silicone pressure sensitive adhesive.

* * * * *